(12) United States Patent
Obeid

(10) Patent No.: US 8,504,414 B2
(45) Date of Patent: Aug. 6, 2013

(54) MARGIN CALCULATOR FOR THE TEMPORARY STAFFING INDUSTRY

(75) Inventor: Diya Obeid, New York, NY (US)

(73) Assignee: JobDiva, Incorporated, New York, NY (US)

( * ) Notice: Subject to any disclaimer, the term of this patent is extended or adjusted under 35 U.S.C. 154(b) by 747 days.

(21) Appl. No.: 12/168,530

(22) Filed: Jul. 7, 2008

(65) Prior Publication Data

US 2009/0012837 A1    Jan. 8, 2009

Related U.S. Application Data

(60) Provisional application No. 60/948,270, filed on Jul. 6, 2007.

(51) Int. Cl.
G06Q 10/00    (2006.01)

(52) U.S. Cl.
USPC ............ 705/9; 705/7; 705/8; 705/10

(58) Field of Classification Search
USPC ............ 705/9, 10, 11, 35, 36, 7, 8
See application file for complete search history.

(56) References Cited

U.S. PATENT DOCUMENTS

| | | | |
|---|---|---|---|
| 2002/0038235 A1* | 3/2002 | Musafia et al. | 705/11 |
| 2002/0059058 A1* | 5/2002 | Doolin et al. | 704/10 |
| 2002/0123921 A1* | 9/2002 | Frazier | 705/9 |
| 2002/0184148 A1* | 12/2002 | Kahn et al. | 705/40 |
| 2003/0061089 A1 | 3/2003 | Weaver | |
| 2004/0024761 A1* | 2/2004 | Kolbe | 707/9 |
| 2004/0267595 A1* | 12/2004 | Woodings et al. | 705/9 |
| 2007/0106567 A1* | 5/2007 | Harvey et al. | 705/26 |
| 2007/0185790 A1* | 8/2007 | Gardner | 705/30 |
| 2008/0027783 A1* | 1/2008 | Hughes et al. | 705/9 |
| 2008/0172311 A1* | 7/2008 | Curran | 705/32 |
| 2010/0030595 A1* | 2/2010 | Day | 705/7 |

* cited by examiner

*Primary Examiner* — Nga B. Nguyen

(74) *Attorney, Agent, or Firm* — Greenberg Traurig, LLP

(57) ABSTRACT

A system and method for providing accurate margin calculations for the temporary staffing industry. A database is provided to allow multiple users to enter parameters that impact the margin such as payroll, benefits, discounts, rebates, and per diem expenses. The system can also include external data sources for retrieving information that impacts margin, such as locale specific tax information. The combination allows temporary staffing providers to engage negotiate complex temporary staffing contracts while retaining a satisfactory margin.

13 Claims, 8 Drawing Sheets

Figure 5:
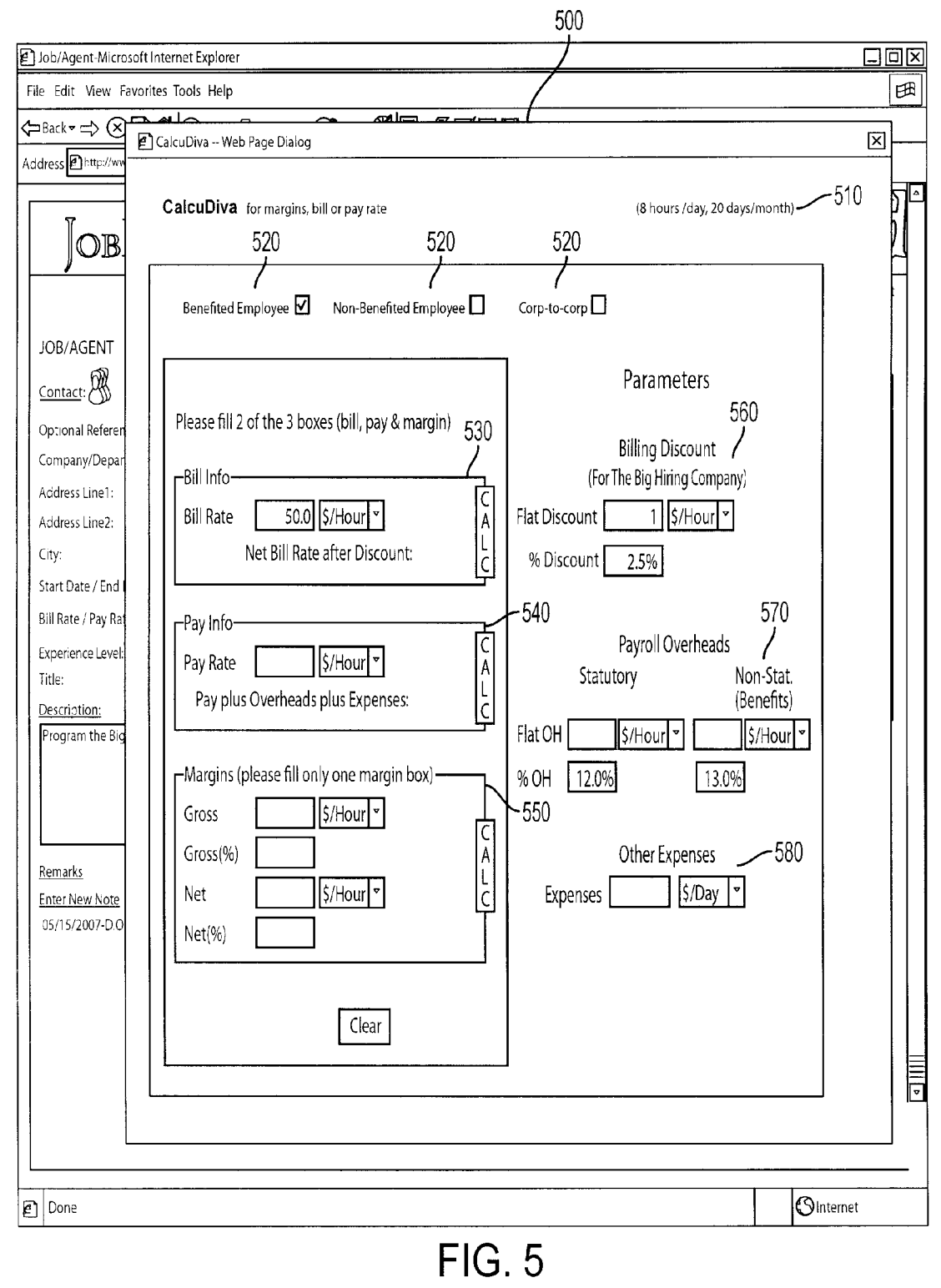

500

CalcuDiva for margins, bill or pay rate          (8 hours /day, 20 days/month) —510

520   520   520

Benefited Employee ☑   Non-Benefited Employee ☐   Corp-to-corp ☐

Parameters
560
Billing Discount
(For The Big Hiring Company)

Please fill 2 of the 3 boxes (bill, pay & margin)  530

Bill Info
Bill Rate   50.0  $/Hour ▼    C A L C
Net Bill Rate after Discount:

Flat Discount   1   $/Hour ▼
% Discount   2.5%

540                                570
Pay Info                        Payroll Overheads
Pay Rate  ___ $/Hour ▼    C A L C    Statutory     Non-Stat.
Pay plus Overheads plus Expenses:                  (Benefits)

Flat OH  ___ $/Hour ▼   ___ $/Hour ▼
% OH    12.0%           13.0%

Margins (please fill only one margin box)
Gross   ___ $/Hour ▼            C A L C
Gross(%) ___
Net     ___ $/Hour ▼
Net(%)  ___

550

Other Expenses  —580
Expenses  ___  $/Day ▼

Clear

MARGIN CALCULATOR FOR THE TEMPORARY STAFFING INDUSTRY

This application claims priority from Provisional U.S. Patent Application Ser. No. 60/948,270, filed on Jul. 6, 2007, which is hereby incorporated by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The instant disclosure relates to the field of personnel staffing, and more specifically to providing accurate margin calculations for personnel staffing.

BACKGROUND

In commercial transactions, the sale amount, also known as the gross revenue, is determined by the sale price minus any rebates, discounts, refunds or other reductions in earnings resulting from the sale. The purchase amount, also known as the cost of revenue, consists of the cost of services that are provided or the cost of goods that are traded. The margin is calculated by subtracting the cost of revenue from the revenue. Obtaining a satisfactory margin is a basic requirement for legitimate free-market commerce and a requirement for keeping a business in operation.

In the staffing industry, calculating the margin is a complex process because the revenue and the cost of revenue depends on many parameters in addition to the bill rate and the pay rate. Some methods in the prior art utilize simplified calculations that typically omit important parameters, resulting in inaccurate calculations. Other methods in the prior art utilize cross reference tables, which assist in looking up a margin based on various values of input parameters.

The methods in the prior art typically require a company to embark on an extensive training program to educate its sales force on how to perform the calculations. However, the inaccurate calculations, and extensive manual data entry make these systems cumbersome and frequently ineffective. This is especially true for businesses operating at or near the margin, which is frequently the case in competitive markets.

SUMMARY

Accordingly, the instant disclosure is directed to systems and methods for calculating temporary staffing industry margins that substantially obviates one or more of the problems due to limitations and disadvantages of the related art.

Additional features and advantages of the invention will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings.

In some embodiments, the system and method provide accurate margin calculations for the temporary staffing industry. A database is provided to allow multiple users to enter parameters that impact the margin such as payroll, benefits, discounts, rebates, and per diem expenses. The system can also include external data sources for retrieving information that impacts margin, such as locale specific tax information. The combination allows temporary staffing providers to engage negotiate complex temporary staffing contracts while retaining a satisfactory margin.

It is to be understood that both the foregoing general description and the following detailed description are exemplary and explanatory and are intended to provide further explanation of the disclosed systems and methods for calculating temporary staffing industry margins.

BRIEF DESCRIPTION OF THE DRAWINGS

The accompanying drawings, which are included to provide a further understanding of the disclosed systems and methods for calculating temporary staffing industry margins and are incorporated in and constitute a part of this specification, illustrate various embodiments and, together with the description, serve to explain the principles of at least one embodiment of the disclosed systems and methods for calculating temporary staffing industry margins.

In the drawings:

FIG. 5 is an exemplary screen capture of a margin calculator interface in accordance with an embodiment.

FIG. 6 is an exemplary screen capture of a margin calculator interface in accordance with an embodiment.

FIG. 7 is an exemplary screen capture of a margin calculator interface in accordance with an embodiment.

FIG. 8 is an exemplary screen capture of a margin calculator interface in accordance with another embodiment.

DETAILED DESCRIPTION

Figure 1:
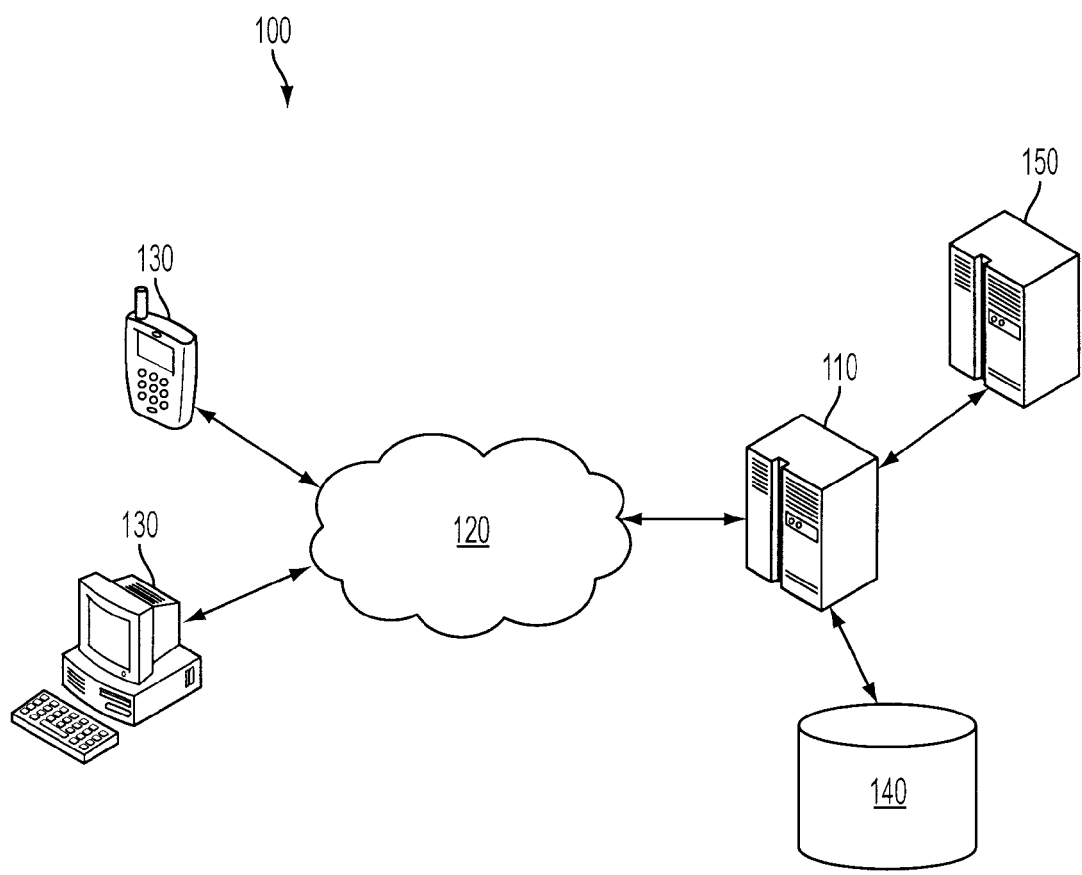
FIG. 1 is a diagram illustrating an exemplary architecture for providing margin calculations in accordance with an embodiment.

Reference will now be made in detail to embodiments of the disclosed systems and methods for calculating temporary staffing industry margins, examples of which are illustrated in the accompanying drawings.

In its simplest form, revenue consists of the sales price for services rendered by the seller to the buyer. A variety of additional parameters can, however, can result in a net increase or decrease in revenue. These revenue impacting parameters include, but are not limited to, rebates, discounts, refunds, or the like. In many cases, several revenue impacting parameters of the same type may simultaneously apply. Revenue impacting parameters can be expressed as a flat amount, a ratio, or a combination thereof. By way of example, without limitation, a company may offer a customer a $500 flat rebate and a 10% rebate on $50,000 of revenue.

The cost of revenue is typically defined as the total cost to the seller of the goods or services rendered by the seller to the buyer. The cost of revenue can encompass a variety of costs, including, without limitation, payroll, direct overhead, and other such costs incurred by the seller in providing services to the buyer. By way of example, without limitation, if the seller provides a worker to the buyer, for one week, and the worker is paid $500 per week, the seller's cost of revenue would be at least $500.

Direct overhead, which can also be referred to as burden, is another parameter that can impact the cost of revenue. Direct overhead can comprise payroll related costs, such as, but not limited to, payroll taxes, per diem expenses, fringe benefits, paid time off, medical insurance, dental insurance, car allowances, or the like.

Payroll taxes can be dependent upon the locale in which a worker is providing service to the buyer. Payroll taxes can vary by state, county, or municipality. Payroll taxes may not be required for workers on expatriate assignments, depending on the location and duration of the assignment. Payroll taxes may take the form of a flat amount, a ratio, or the like.

Margin is typically defined as the difference between revenue and the cost of revenue. Margin can be represented as a flat amount or can be represented by the ratio of the margin to the revenue. When a seller is evaluating a contract to provide services to a buyer, the seller may have a margin amount or margin ratio that must be attained.

In the temporary staffing industry, staffing contracts can take on a variety of forms and sizes with varying levels of complexity associated therewith. A simple temporary staffing contract may involve providing a laborer to a customer for a day. A complex temporary staffing contract may involve providing technicians, engineers, marketing personnel, and support staff in several countries over a much longer period. The skills necessary to analyze a customer's staffing requirements for engineers can be different than those with respect to marketing personnel. Similarly, different skills can be necessary for analyzing staffing requirements in different countries, which can lead to multiple individuals being involved in the temporary staffing contract process.

These contracting individuals may be located in different offices, across time zones and may not share a common language. Local culture may dictate that certain rebates, discounts, refunds, or the like be applied at different points during the formation of the contract. With multiple individuals involved in the process, the supplied temporary staffing may result in multiple rebates, discounts, and refunds being applied, resulting in an unacceptable margin.

FIG. 1 illustrates a system architecture 100 for providing margin calculations for the temporary staffing industry in accordance with an embodiment. A server 110 is communicatively coupled to a communication network 120. One or more client devices 130 are communicatively coupled to communication network 120, such that they can communicate with server 110. Communication network 120 may comprise a private or non-private network such as, but not limited to the Internet. In addition, some or all parts of the communications between client device 130 and server 110 may be secured using one or more secure communication methods including, without limitation, Virtual Private Networking ("VPN"), Secure Sockets Layer ("SSL"), the Advanced Encryption Standard ("AES"), Triple Data Encryption Standard ("3DES"), or the like.

In some embodiments, client device 130 can comprise a personal computer or other networked device capable of running a world wide web browsing application (referred to herein as a "browser"). Client device 130 can also comprise wireless text paging devices such as the BlackBerry Pearl, BlackBerry Curve models sold by Research in Motion of Waterloo, Ontario, Canada; cellular phones such as the Treo 755p model sold by Palm, Inc. of Sunnyvale, Calif.; and Personal Digital Assistants ("PDAs") such as the iPaq model sold by Hewlett-Packard Company of Palo Alto, Calif.; and the like.

In some embodiments, server 110 is communicatively coupled to a database 140. Database 140 can store a variety of different electronic records, including, but not limited to, job openings, employee profiles, client related parameters, revenue parameters, cost of revenue parameters, or the like.

Database 140 may be implemented using any of a variety of well-known databases, including, without limitation, Microsoft Access or Microsoft SQL Server distributed by Microsoft Corporation of Redmond, Wash., Oracle Database distributed by Oracle Corporation of Redwood Shores, Calif., or MySQL distributed by MySQL Inc. of Cupertino, Calif.

In some embodiments, server 110 can be communicatively coupled to one or more external data sources 150. In some embodiments, external data source 150 can comprise data sources containing payroll tax information for one or more localities. In some embodiments, external data source 150 can comprise a data source containing tax laws pertaining to expatriate assignments. External data sources 150 can comprise any system external to server 110 that contains data pertinent to providing margin calculations for the temporary staffing industry.

In some embodiments, server 110 may further comprise a web application server, wherein the web application server provides a margin calculator interface to client device 130 via a browser interpretable document. The margin calculator interface may be defined by one or more markup languages, such as, but not limited to, Hypertext Markup Language ("HTML"), eXtensible Markup Language ("XML"), JavaScript, Asynchronous JavaScript and XML ("AJAX") or the like. Suitable web application servers may include, but are not limited to, Internet Information Services ("IIS") distributed by Microsoft Corporation of Redmond, Wash. or Apache HTTP Server distributed by the Apache Software Foundation.

Figure 2:
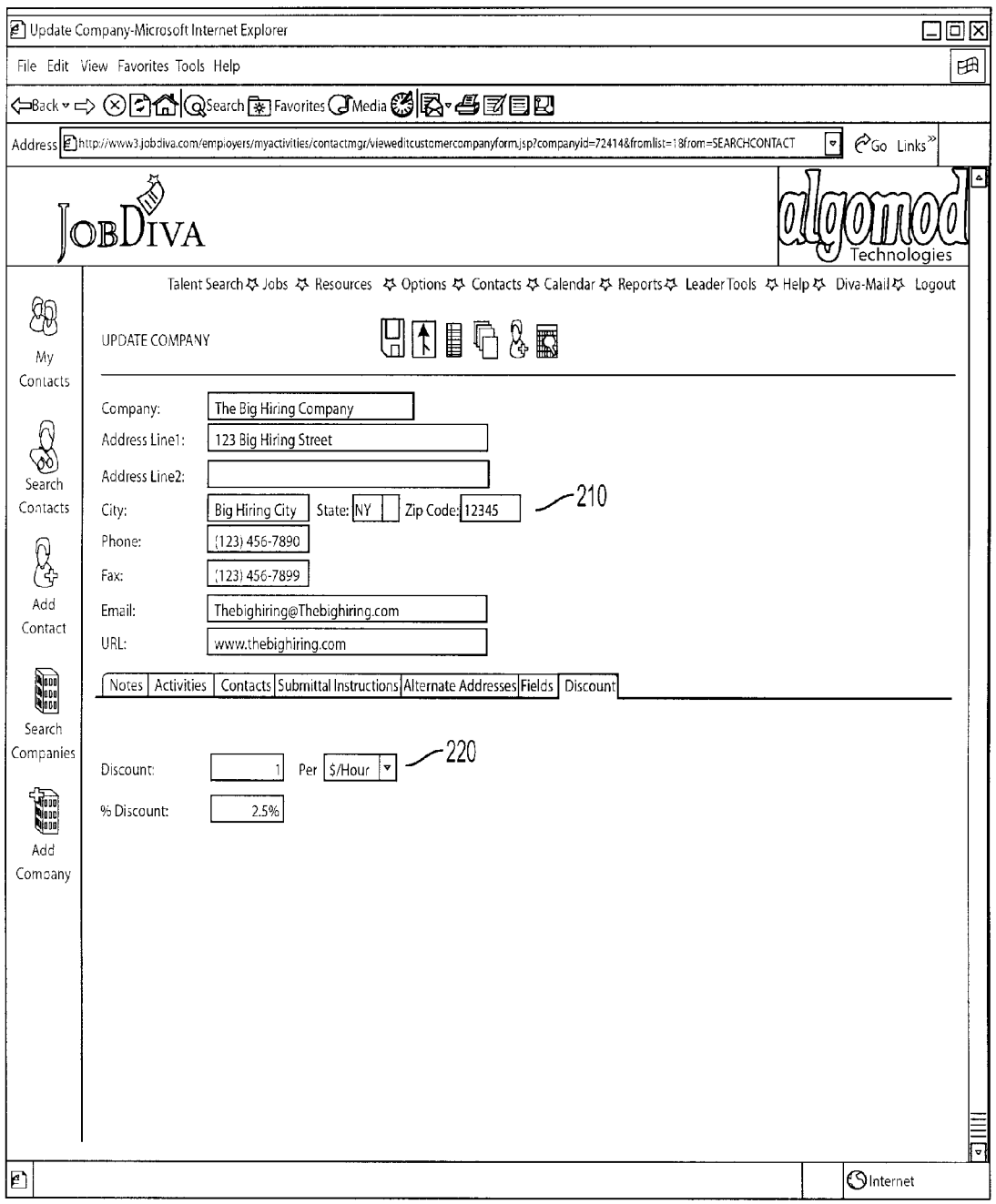
FIG. 2 is an exemplary screen capture of a margin calculator interface in accordance with an embodiment.

In some embodiments, database 140 can contain buyer information about each buyer to whom the seller provides temporary staffing services. The margin calculator interface can allow a user to enter buyer information, as illustrated in FIG. 2. The margin calculator interface allows the user to enter or update buyer contact information using buyer contact information fields 210. The user can also enter discount information associated with the buyer in discount information field 220. Although discount information field 220 is illustrated as allowing the user to input a per hour discount, other forms of discounts may be entered, such as, but not limited to, flat discounts per job, discounts determined as a percentage of the total cost, or the like.

Figure 3:
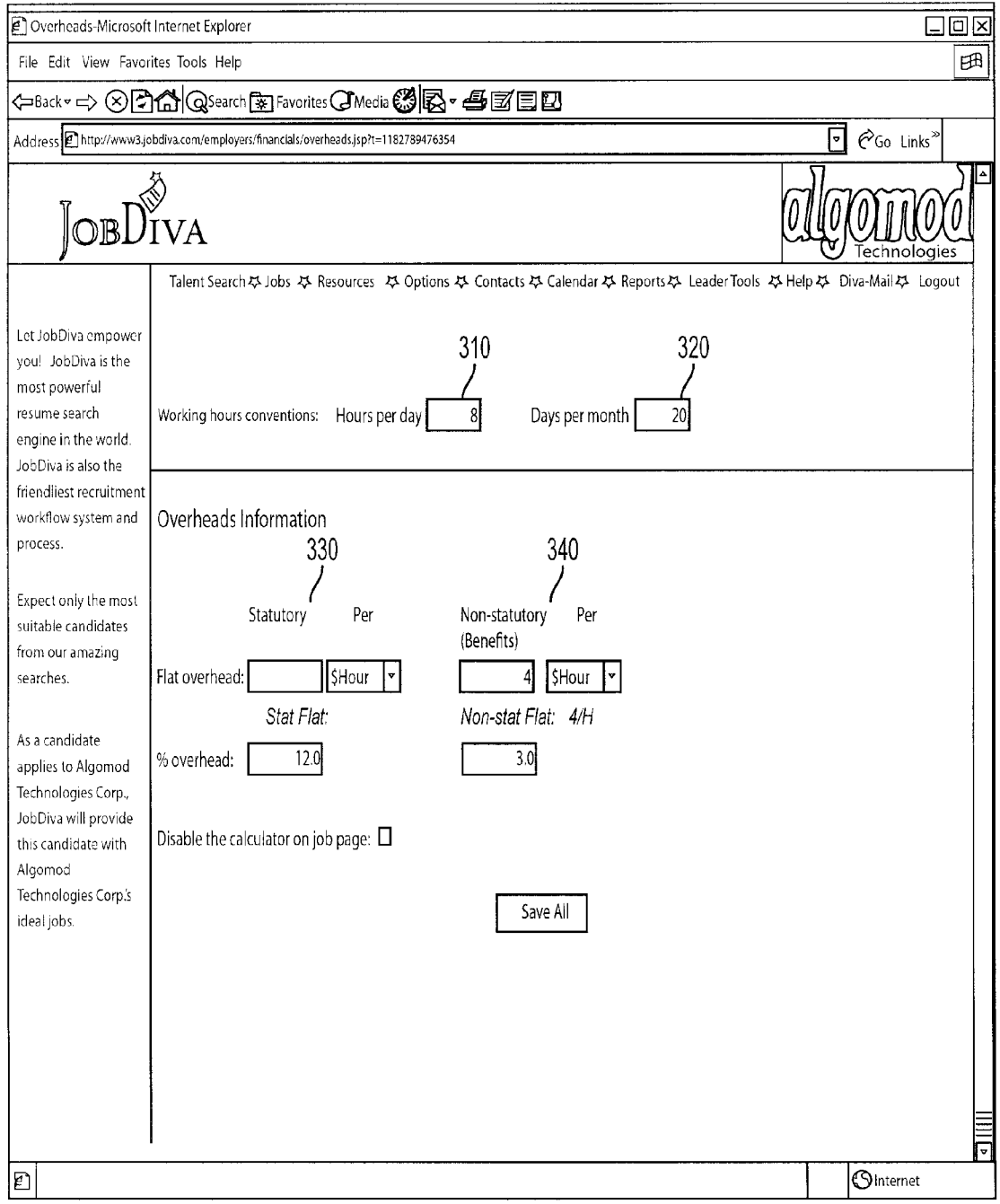
FIG. 3 is an exemplary screen capture of a margin calculator interface in accordance with an embodiment.

In some embodiments, as illustrated in FIG. 3, the margin calculator interface can receive work day conventions from the user. Work day conventions specify the standard work schedule for employees at a buyer's company. In FIG. 3, hours per day field 310 and days per month field 320 allow the user to define a standard work schedule in terms of hours per day and hours per week. In some embodiments, the margin calculator interface can allow the user to define work schedule by hours per month. In some embodiments, the margin calculator can provide the user with more granularity in defining the work schedule by allowing the user to enter in hours per day of the week or the like. The margin calculator interface can also allow the user to input default statutory and non-statutory revenue impacting parameters by providing statutory revenue parameter field 330 and non-statutory parameter field 340. In some embodiments, statutory taxes comprise the employer potion of social security. In some embodiments, statutory taxes comprise the employer portion of medicare. In some embodiments, statutory taxes comprise unemployment insurance. In some embodiments, statutory taxes comprise worker's compensation insurance. In some embodiments, statutory taxes comprise disability insurance.

Figure 4:
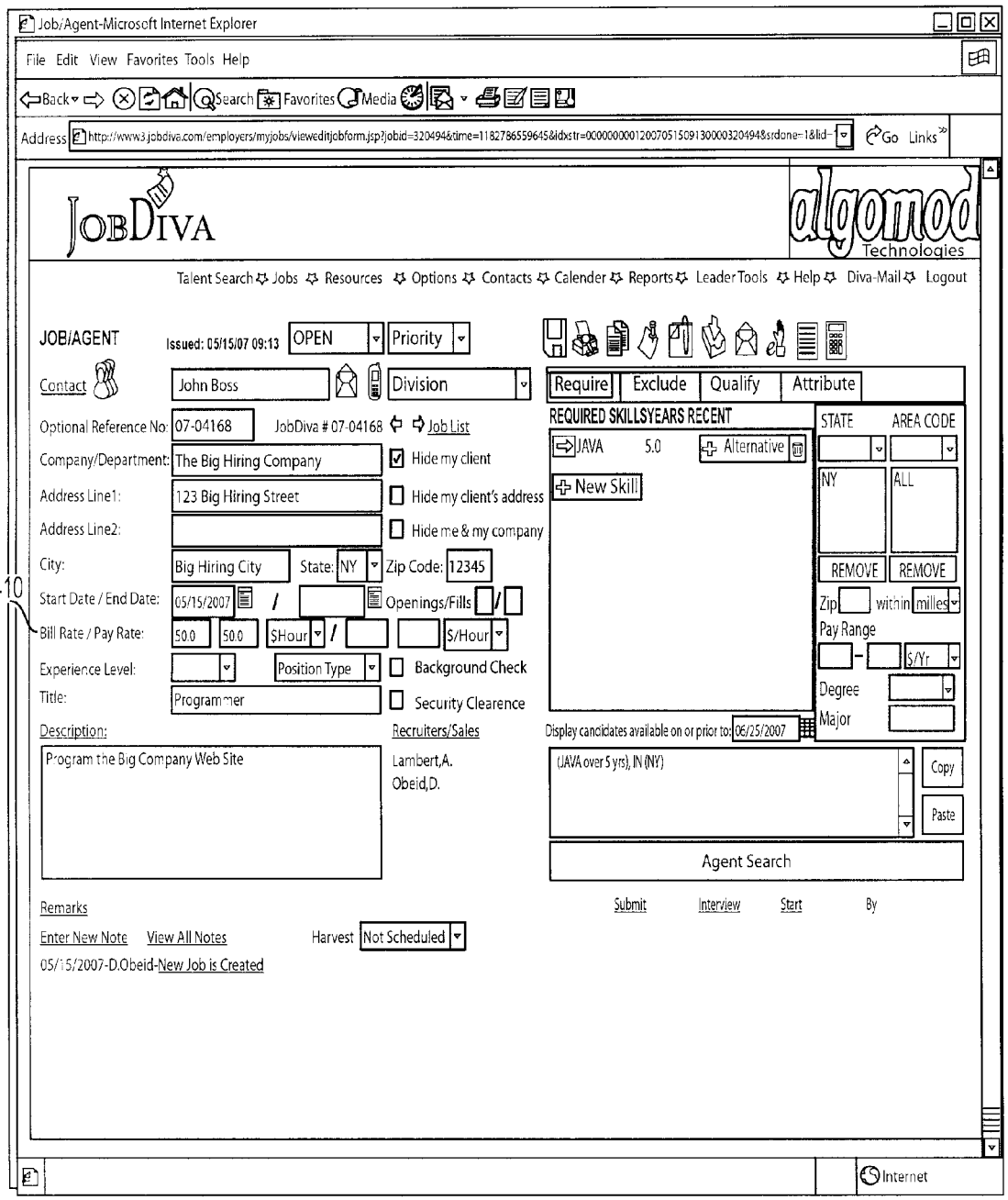
FIG. 4 is an exemplary screen capture of a margin calculator interface in accordance with an embodiment.

In some embodiments, as illustrated in FIG. 4, the margin calculator interface can allow the user to enter job profile for an open position. The user can utilize the job profile to choose personnel to assign to the open position as part of the temporary staffing negotiation process. The Bill Rate and Pay Rate fields 410 retain the anticipated rates for a job. Using the calculator icon above the Attribute tab, the user calculates the acceptable pay rate which will generate an acceptable margin for the company. This acceptable pay rate is used in the Pay Range fields in the middle right side of the screen to search the data base for candidates who match the acceptable pay rates or pay rate range. This screen illustrates a scenario where the calculator is utilized in the recruiting or job assignment process. It is only one embodiment and one example of a touch point where the margin calculator is called for in a staffing or recruitment process.

Figure 6:
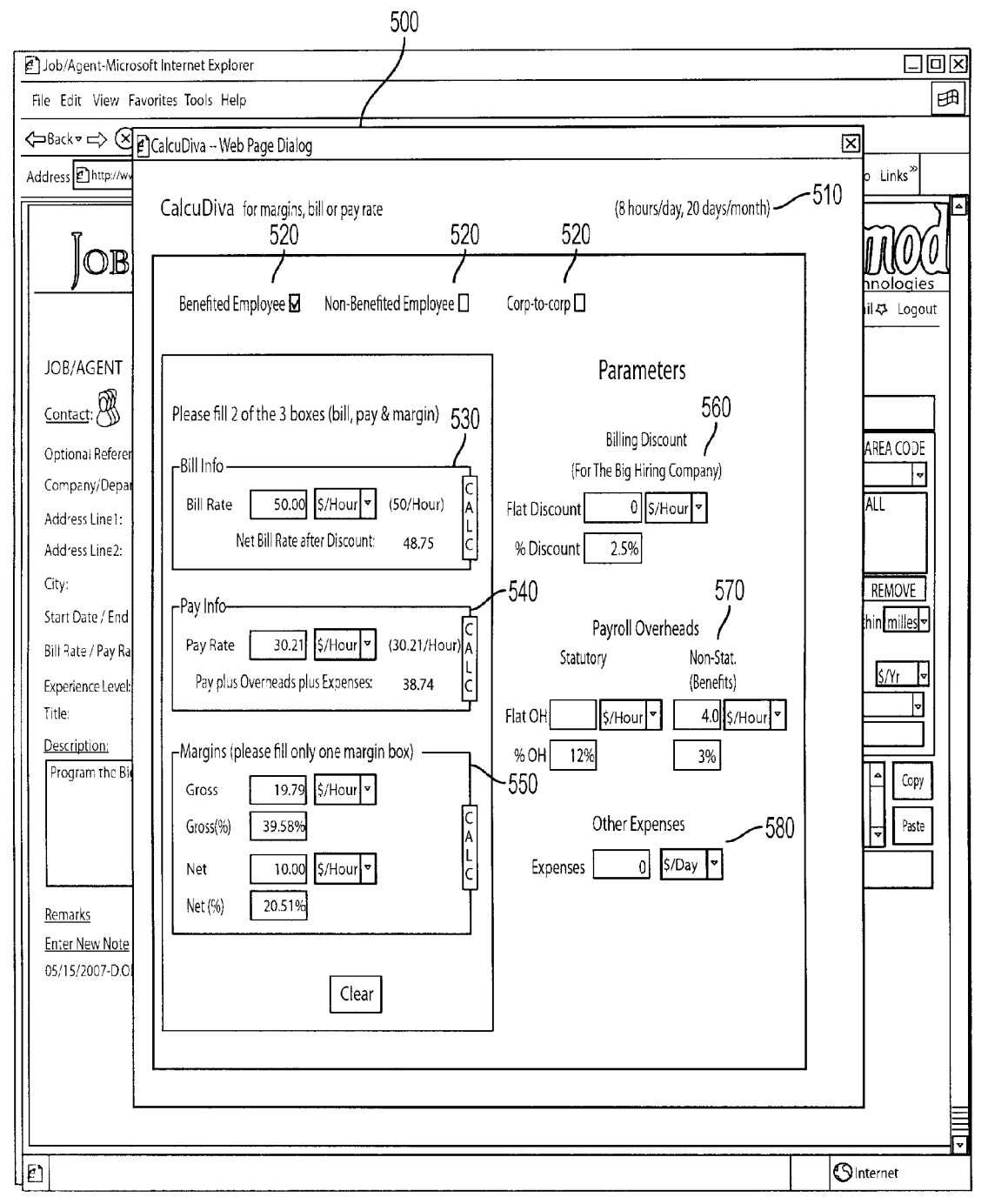
Figure 7:
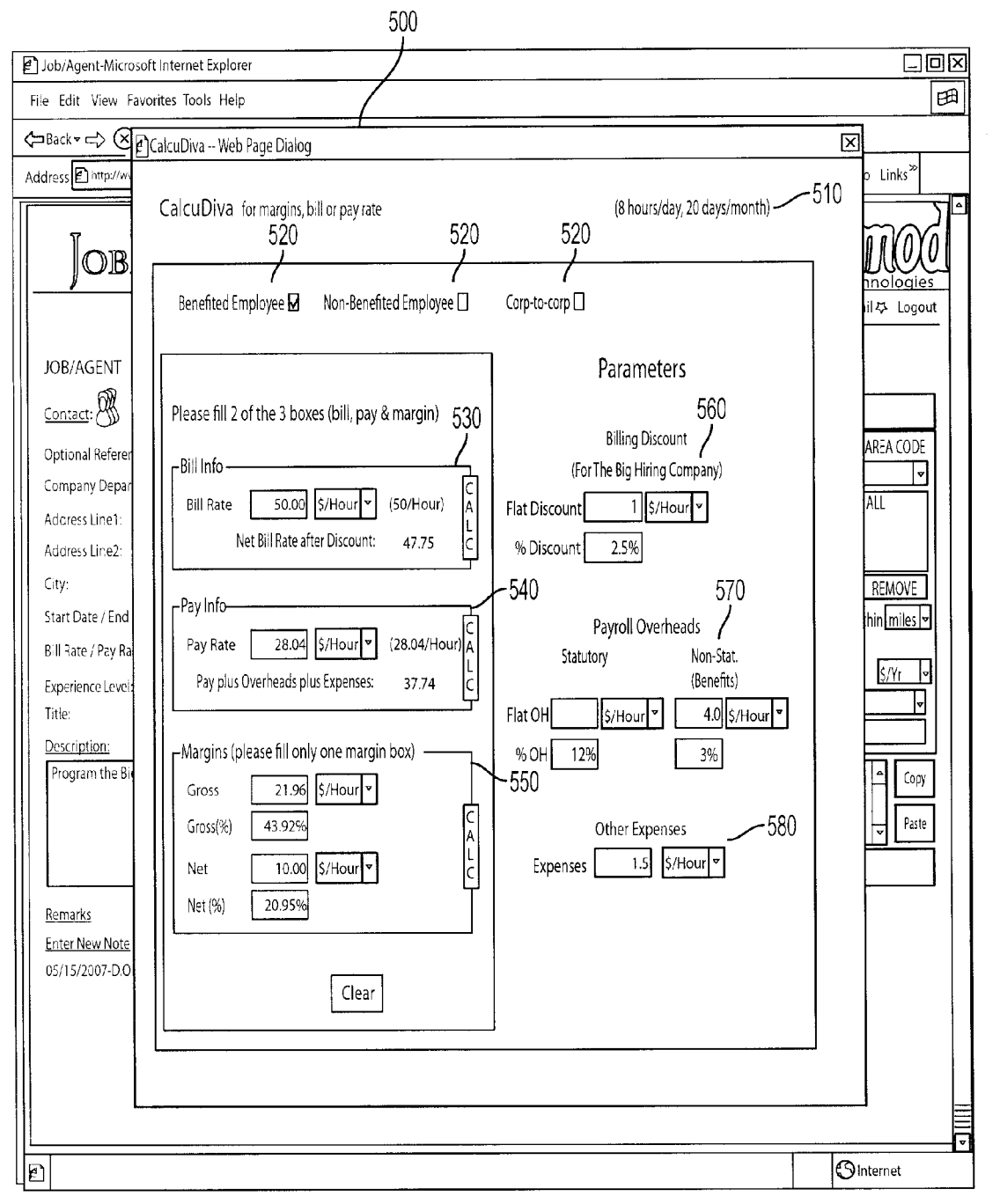

FIGS. 5-7 illustrate the margin calculator interface displaying a calculator dialog 500 in accordance with some embodiments. Calculator dialog 500 can contain a workday convention field 510 for displaying the work day convention information to the user. In some embodiments, calculator dialog 500 can contain one or more employee class checkboxes 520 for assigning a class to the employee for which a calculation is being performed. In some embodiments, checking different employee class checkboxes 520 may add or remove fields from calculator dialog 500. By way of example, without limitation, by selecting that employee class checkbox 520 that corresponds to a non-benefited employee, calculator dialog 500 may remove any data fields that relate to the cost of benefits.

In some embodiments, calculator dialog 500 can provide a billing information calculator 530, a payroll information calculator 540, a margins calculator 550, a billing discount field 560, a payroll overhead field 570, and an other expenses field 580. Billing discount field 560, payroll overhead field 570, and other expenses field 580 allow a user to enter job-specific information that affects the margin for a temporary worker.

In some embodiments, billing discount field 560 can allow the user to enter discounts that affect the billing rate charged to a customer for a specific job. As discussed above, billing discounts can take many forms. Billing discount field 560 allows the user to enter one or more discounts, in any form. The net effect of the discounts on the billing rate for the temporary worker is calculated and displayed by billing information calculator 530.

In some embodiments, billing information calculator 530 can perform calculations on client device 130 or on server 110. When the calculations are performed on client device 130, client device 130 can request necessary data to complete the calculations from server 110. To obtain the necessary data, server 110 may query database 140 and/or one or more external data sources 150.

In some embodiments, payroll overhead field 570 can allow the user to enter statutory and non-statutory payroll overhead data. Payroll information calculator 540 calculates and displays the overall cost of the temporary worker based upon the temporary worker's salary and the data entered into payroll overhead field 570. In embodiments in which external data source 150 comprises a tax data source, calculator dialog 500 may not require the user to enter statutory overhead information. In embodiments in which external data source 150 comprises on or more sources for tax data and non-statutory overhead information, calculator dialog 500 may simply comprise payroll overhead field 570.

In some embodiments, other expenses field 580 can allow the user to enter any additional costs associated with the temporary worker. By way of example, without limitation, the user may enter a per diem hotel allowance into other expenses field 580. Margins calculator 550 calculates and displays the gross margin and net margin associated with providing the temporary worker. Margins calculator 550 takes into account both any information entered by the user as well as any other revenue impacting parameters entered by other users of the system.

In some embodiments, the system may not allow a user to enter a discount that would lower the margin below a threshold.

In FIG. 7, in one embodiment, the CALC button of the margins calculator 550 is pressed to calculate the amounts and percentages in 550 after Bill Rate in the billing information calculator 530 and Pay Rate in the payroll information calculator 540 are entered. In FIG. 7, in another embodiment, The CALC button of the payroll information calculator 540 is pressed to calculate the Pay Rate in 540 after Bill Rate in the billing information calculator 530 is entered and one of the amounts or percentages in the margins calculator 550 is entered. In FIG. 7, in another embodiment, The CALC button of the billing information calculator 530 is pressed to calculate Bill Rate in 530 after Pay Rate in the payroll information calculator 540 is entered and one of the amounts or percentages in the margins calculator 550 is entered.

In the billing information calculator 530, the Net Bill Rate after Discount comprises the Bill Rate minus the Flat Discount in the billing discount field 560 minus the % Discount in the billing discount field 560 multiplied by the Bill Rate in the billing information calculator 530. Before subtracting the Bill rate from the Flat Discount, the Flat Discount is converted to the same time unit used for the Bill rate. As an example, FIG. 500 shows a day being 8 hours day and a month being 20 days. In this example, a flat discount of $1 per hour would be equivalent to $8 discount per day. In some embodiments, a week is five days and a year is 12 months.

In the payroll information calculator 540, in one embodiment Benefited Employee of 520 is checked. When Benefited Employee is Checked, the Pay plus Overheads Plus Expenses comprises the Pay Rate plus the Statutory Flat OH in the payroll overhead field 570 plus the Statutory % OH in the payroll overhead field 570 plus the Non-Stat (Benefits) Flat OH in 570 plus the Non-Stat (Benefits) % OH in the payroll overhead field 570 plus Expenses in the other expenses field 580.

In the payroll information calculator 540, in one embodiment Non-Benefited Employee of 520 is checked. When Non-Benefited Employee is Checked, the Pay plus Overheads Plus Expenses comprises the Pay Rate plus the Statutory Flat OH in the payroll overhead field 570 plus the Statutory % OH in 570 plus Expenses in the other expenses field 580. In the payroll information calculator 540, in one embodiment Coro-to-Corp of 520 is checked. When Benefited Employee is checked, the Pay plus Overheads Plus Expenses comprises the Pay Rate plus Expenses in the other expenses field 580.

In the margins calculator 550, Gross is the difference between Bill Rate in the billing information calculator 530 minus Pay Rate in the payroll information calculator 540. To subtract the Pay Rate in the payroll information calculator 540 from Bill Rate in the billing information calculator 530, Pay Rate and Bill Rate are converted to the time unit of Gross in the margins calculator 550. Gross(%) is one hundred times Gross in the payroll information calculator 540 divided by Bill Rate in the billing information calculator 530. To perform the division, Gross is converted to the same time unit of Bill Rate.

In the margins calculator 550, Net is the difference between Net Bill Rate after Discount in the billing information calculator 530 minus Pay plus Overheads plus Expenses in the payroll information calculator 540. To subtract the Pay plus Overheads plus Expenses in the payroll information calculator 540 from Net Bill Rate after Discount in the billing information calculator 530, Pay plus Overheads plus Expenses and Net Bill Rate after Discount are converted to the time unit of Net in the margins calculator 550. Net(%) is one hundred times Net in the payroll information calculator 540 divided by Net Bill Rate after Discount in the billing information calculator 530. To perform the division, Net is converted to the same time unit of Net Bill Rate after Discount.

Figure 8:
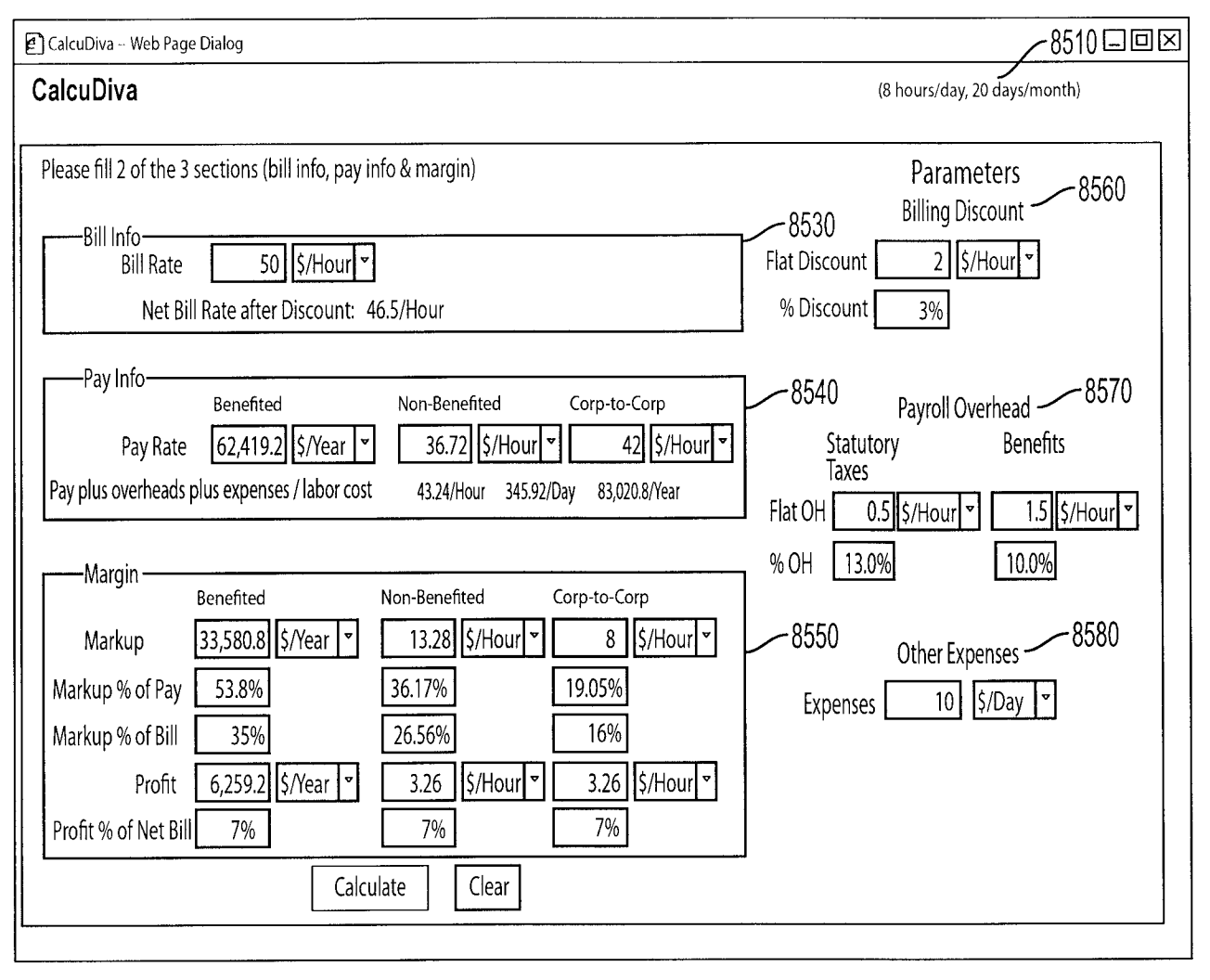

As illustrated in FIG. 8, in some embodiments, the payroll information calculator 8540 comprises Benefited amounts and percentages, Non-Benefited amounts and percentages and Corp-to-Corp amounts and percentages. As illustrated in FIG. 8, in some embodiments, the margins calculator 8550 comprises Benefited amounts and percentages, Non-Benefited amounts and percentages and Corp-to-Corp amounts and percentages.

In some embodiments, as illustrated in FIG. 8, only one amount is entered in the payroll information calculator 8540. In other embodiments, as illustrated in FIG. 8, only one amount or percentage is entered in the margins calculator 8550.

In some embodiments, as illustrated in FIG. 8, Markup in the margins calculator 8550 comprises Gross in the margins calculator 550 of FIG. 7. In some embodiments, as illustrated in FIG. 8, Markup % of Pay in the margins calculator 8550 comprises one hundred times Markup divided by Pay Rate in the payroll information calculator 8540 for the corresponding column of Benefited, Non-Benefited or Corp-to-Corp. In some embodiments, as illustrated in FIG. 8, Markup % of Bill in the margins calculator 8550 comprises one hundred times Markup divided by Bill Rate in the billing information calculator 8530 for the corresponding column of Benefited, Non-Benefited or Corp-to-Corp.

In some embodiments, as illustrated in FIG. 8, Profit in the margins calculator 8550 comprises Net in the margins calculator 550 of FIG. 7.

As illustrated in FIG. 8, in the margins calculator 8550, Profit is the difference between Net Bill Rate after Discount in the billing information calculator 530 minus Pay plus Overheads plus Expenses in the payroll information calculator 8540 for each of the Benefited, Non-Benefited and Corp-to-Corp columns. To subtract the Pay plus Overheads plus Expenses in the payroll information calculator 8540 from Net Bill Rate after Discount in the billing information calculator 8530, Pay plus Overheads plus Expenses and Net Bill Rate after Discount are converted to the time unit of Profit in the margins calculator 8550. Profit % of Net Bill is one hundred times Profit in the payroll information calculator 8540 divided by Net Bill Rate after Discount in the billing information calculator 8530. To perform the division, Profit is converted to the same time unit of Net Bill Rate after Discount.

As illustrated in FIG. 8, in one embodiment when an amount or percentage is entered in the margins calculator 8550, upon pressing the Calculate button, the same entered amount or percentage is propagated horizontally for each of the Benefited, Non-Benefited and Corp-to-Corp corresponding boxes. As illustrated in FIG. 8, in one embodiment when an amount is entered in the payroll information calculator 8540, the amount is converted to two amounts in the empty Benefited, Non-Benefited and Corp-to-Corp boxes. The arrived amounts after conversion for each of the Benefited resulting amount, Non-Benefited resulting amount and Corp-to-Corp amount will provide the same Pay plus Overhead plus Expenses amount.

In one embodiment, the three CALC buttons of FIG. 7 are replaced with one or two CALC buttons. In another embodiment, the Calculate button of FIG. 8 is replaced with one or two buttons.

In one embodiment, when an amount is entered in the payroll information calculator 540 or the payroll information calculator 8540, all the data entry boxes in the payroll information calculator 540 or 8540 are blocked from further data entry until the calculation occurs. In one embodiment, when an amount or percentage is entered in the margins calculator 550 or the margins calculator 8550, all data entry boxes in the margins calculator 550 or 9550 are blocked from further data entry until the calculation occurs.

In some embodiments, the system may comprise one or more levels of permissions. Permissions may be used to limit a user's ability to modify different parameters used to calculate margin. By way of example, without limitation, the system may only allow users in accounting to modify parameters relating to statutory overhead. By way of another example, without limitation, the system may only allow upper level managers to modify customer-wide discounts.

While detailed and specific embodiments of the systems and methods for calculating temporary staffing industry margins have been described herein, it will be apparent to those skilled in the art that various changes and modifications can be made therein without departing from the spirit and scope of the disclosed systems and methods for calculating temporary staffing industry margins. Thus, it is intended that the present disclosure cover these modifications and variations provided they come within the scope of any appended claims and/or their equivalents.

What is claimed is:

1. A system for providing margin calculations for staff in the temporary staffing industry comprising:
    a database comprising a plurality of electronic records, the electronic records comprising staffing margin calculation parameters;
    a server, communicatively coupled to the database, the server generating staffing margin calculations based upon staffing margin calculation parameters; and,
    a client device, communicatively coupled to the server, the client device displaying a staffing margin calculation interface to a user, the staffing margin calculation interface receiving staffing margin calculation parameters from the user and transmitting the staffing margin calculation parameters to the database by way of the server, the staffing margin calculation interface receiving staffing margin calculations from the server and displaying the staffing margin calculations to the user, the staffing margin calculation interface associating the staffing margin calculation parameters and the staffing margin calculations with an employee record and storing the employee record in the database by way of the server.

2. The system of claim 1, further comprising an external data source, the external data source providing additional margin calculation parameters to the server.

3. The system of claim 1, the client device comprising a computer.

4. The system of claim 1, the client device comprising a cellular phone.

5. The system of claim 1, the electronic records further comprising client profiles.

6. The system of claim 5, the client profiles further comprising client specific margin calculation parameters.

7. The system of claim 6, the client specific margin calculation parameters comprising a discount.

8. The system of claim 1, the margin calculation interface preventing a user from entering a discount if the discount would result in the margin being less than a threshold margin value.

9. The system of claim 1, the margin calculation parameters comprising revenue impacting parameters.

10. The system of claim 1, the margin calculation parameters comprising overhead parameters.

11. The system of claim 10, the overhead parameters comprising salary.

12. The system of claim 10, the overhead parameters comprising payroll taxes.

13. Computer program process code, tangibly stored on at least one computer readable medium and executable by a processor running on a computing device, the computer program process code comprising instructions for:

storing a plurality of electronic records in a database, the electronic records comprising staffing margin calculation parameters;

displaying a staffing margin calculation interface to a user on a client device;

receiving staffing margin calculation parameters from the user via the margin calculation interface;

generating staffing margin calculations on a server, the staffing margin calculations based upon the staffing margin calculation parameters in the database and the staffing margin calculation parameters received by the staffing margin calculation interface; and, displaying the staffing margin calculations to the user via the staffing margin calculation interface;

allowing the user to associate the staffing margin calculation parameters and the staffing margin calculations with an employee record via the margin calculation interface.

* * * * *